(12) United States Patent
Fegely et al.

(10) Patent No.: US 10,329,013 B2
(45) Date of Patent: Jun. 25, 2019

(54) STEADY STATE DIFFERENTIAL ROLL MOMENT CONTROL WITH AUTOMATED DIFFERENTIAL LATERAL CONTROL

(71) Applicant: Sikorsky Aircraft Corporation, Stratford, CT (US)

(72) Inventors: Cody Fegely, Milford, CT (US); Erez Eller, Oakville (CA); Kenneth S. Wittmer, Sandy Hook, CT (US); Aaron L. Greenfield, Shelton, CT (US); John Knag, New Boston, NH (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 142 days.

(21) Appl. No.: 15/513,334

(22) PCT Filed: Sep. 24, 2015

(86) PCT No.: PCT/US2015/051914
§ 371 (c)(1),
(2) Date: Mar. 22, 2017

(87) PCT Pub. No.: WO2016/060816
PCT Pub. Date: Apr. 21, 2016

(65) Prior Publication Data
US 2017/0334556 A1 Nov. 23, 2017

Related U.S. Application Data

(60) Provisional application No. 62/055,151, filed on Sep. 25, 2014.

(51) Int. Cl.
*G05D 1/08* (2006.01)
*B64C 27/10* (2006.01)
*B64C 27/80* (2006.01)

(52) U.S. Cl.
CPC .............. *B64C 27/80* (2013.01); *B64C 27/10* (2013.01); *G05D 1/0808* (2013.01); *G05D 1/0858* (2013.01)

(58) Field of Classification Search
CPC ......... B64C 27/80; B64C 27/10; B64C 27/04; B64C 2027/7261; G05D 1/0808; G05D 1/0858; G05B 19/0428
(Continued)

(56) References Cited

U.S. PATENT DOCUMENTS

| 3,409,249 A | 11/1968 | Bergquist et al. |
| 4,008,979 A | 2/1977 | Cooper et al. |

(Continued)

FOREIGN PATENT DOCUMENTS

EP 2476614 A2 7/2012

OTHER PUBLICATIONS

PCT International Search Report and Written Opinion; International Application No. PCT/US2015/51914; International Filing Date: Sep. 24, 2015; dated Mar. 11, 2016; pp. 1-14.
(Continued)

*Primary Examiner* — Krishnan Ramesh
(74) *Attorney, Agent, or Firm* — Cantor Colburn LLP

(57) ABSTRACT

A method for controlling a differential rotor roll moment for a coaxial helicopter with rigid rotors, the method including receiving, with a processor, a signal indicative of a displacement command from a controller; receiving, with the processor via a sensor, one or more signals indicative of a longitudinal velocity, an angular velocity of one or more rotors and an air density ratio for the helicopter; determining, with the processor, a ganged collective mixing command in response to the receiving of the displacement command; determining, with the processor, a rotor advance ratio as a function of the longitudinal velocity and the
(Continued)

angular velocity; and determining, with the processor, a corrective differential lateral cyclic command for the rigid rotors that controls the differential rotor roll moment to a desired value.

13 Claims, 6 Drawing Sheets

(58) Field of Classification Search
USPC .............................. 701/4; 244/17.13; 416/1
See application file for complete search history.

(56) References Cited

U.S. PATENT DOCUMENTS

| | | |
|---|---|---|
| 4,027,999 A | 6/1977 | Durno |
| 7,677,492 B1 * | 3/2010 | Carter, Jr. ............. B64C 27/022 |
| | | 244/17.11 |
| 8,128,034 B2 | 3/2012 | Karem |
| 2007/0164167 A1 * | 7/2007 | Bachelder .............. G05D 1/105 |
| | | 244/220 |
| 2010/0047067 A1 | 2/2010 | Houser et al. |
| 2010/0270422 A1 | 10/2010 | Karem |
| 2011/0180656 A1 | 7/2011 | Shue et al. |
| 2012/0181379 A1 | 7/2012 | Eller et al. |
| 2013/0332022 A1 | 12/2013 | Green et al. |
| 2014/0229037 A1 * | 8/2014 | Dequin .................. B64D 31/06 |
| | | 701/3 |
| 2014/0324280 A1 | 10/2014 | Green et al. |

OTHER PUBLICATIONS

The extended European search report; Application No. EP 15851304.4; dated Apr. 30, 2018; pp. 1-8.

PCT International Preliminary Report on Patentability; International Application No. PCT/US2015/051914; International Filing Date: Sep. 24, 2015; dated Apr. 6, 2017; pp. 1-7.

* cited by examiner

STEADY STATE DIFFERENTIAL ROLL MOMENT CONTROL WITH AUTOMATED DIFFERENTIAL LATERAL CONTROL

CROSS REFERENCE TO RELATED APPLICATIONS

The present application is a National Stage Application claiming priority to Patent Application PCT/US2015/051914 filed on Sep. 24, 2015, which claims priority from U.S. Provisional Application Ser. No. 62/055,151 filed on Sep. 25, 2014, the contents of which are incorporated herein by reference in their entirety.

BACKGROUND

The subject matter disclosed herein relates generally to the field of helicopter control and to a steady state differential roll moment control with automated differential lateral control commands for rigid dual-rotor helicopters.

DESCRIPTION OF RELATED ART

Rigid dual rotor helicopters are those with two coaxial, counter-rotating rotors. Each rotor is controlled by a respective independent swash plate and can be commanded with both differential and ganged collective and cyclic controls. Rigid coaxial rotor helicopters must be designed with sufficient rotor spacing to ensure that the blade tips never touch during any maneuver in the flight envelope. As forward flight speed increases, the advancing portion of the rotor produces more lift than the retreating portion because the relative wind speed is higher. This phenomenon is lift offset, the measure of where the center of lift is generated on the two rotors. The use of collective control also changes lift offset with forward airspeed. Lift offset produces opposing roll moments, thus the rotor roll moments acting on each rotor are substantially opposing. These roll moments reduce tip clearance on the rotor blades. Further, these roll moments are large and generally greater than what is needed to maneuver the helicopter. Additionally, lift offset can adversely affect tip clearance. In conventional rigid dual rotor helicopters, lift offset is manually maintained by the pilot via a differential lateral cyclic beeper or adjusting the relative control phase angle of the individual swash plates which transforms some of the ganged longitudinal cyclic into differential lateral cyclic. An advanced rotorcraft control law with an automatic differential lateral control command for managing differential roll moment would be well received in the art.

SUMMARY

According to one exemplary embodiment, a method for controlling a differential rotor roll moment for a coaxial helicopter with rigid rotors includes receiving, with a processor, a signal indicative of a displacement command from a controller; receiving, with the processor via a sensor, one or more signals indicative of a longitudinal velocity, an angular velocity of one or more rotors and an air density ratio for the helicopter; determining, with the processor, a ganged collective mixing command in response to the receiving of the displacement command; determining, with the processor, a rotor advance ratio as a function of the longitudinal velocity and the angular velocity; and determining, with the processor, a corrective differential lateral cyclic command for the rigid rotors that controls the differential rotor roll moment to a desired value.

In addition to one or more of the features described above, or as an alternative, further embodiments could include determining the corrective differential lateral cyclic command with a model which is a function of the ganged collective mixing command, air density ratio, and rotor advance ratio.

In addition to one or more of the features described above, or as an alternative, further embodiments could include determining the corrective differential lateral cyclic command as a function of measured differential rolling moments and targeted differential rolling moments.

In addition to one or more of the features described above, or as an alternative, further embodiments could include varying the targeted differential rolling moment based upon aircraft flight condition, including at a minimum longitudinal velocity.

In addition to one or more of the features described above, or as an alternative, further embodiments could include determining an error value between the measured and targeted differential rolling moments.

In addition to one or more of the features described above, or as an alternative, further embodiments could include determining the corrective differential lateral cyclic command for rotor speeds above a predefined threshold value.

In addition to one or more of the features described above, or as an alternative, further embodiments could include determining the corrective differential lateral cyclic command as (i) a function of a gain of the rotor advance ratio and/or (ii) a function of upper and lower limits of differential lateral cyclic.

In addition to one or more of the features described above, or as an alternative, further embodiments could include determining a quantity of corrective differential lateral cyclic command at different rotor speeds.

According to one exemplary embodiment, a control system for controlling a differential rotor roll moment for a coaxial helicopter with rigid rotors includes one or more sensors configured to determine a longitudinal velocity of the helicopter, an angular velocity of one or more rotors and an air density ratio for the helicopter; one or more controllers configured to issue a displacement command during a flight maneuver; and a computer operably connected to the one or more controllers and configured to: determine a ganged collective mixing command in response to the displacement command; determine a rotor advance ratio as a function of the longitudinal velocity and the angular velocity; and determine a corrective differential lateral cyclic command for the rigid rotors to control the differential rotor roll moment to a desired value.

In addition to one or more of the features described above, or as an alternative, further embodiments could include the processor configured to determine the corrective differential lateral cyclic command as a function of the ganged collective mixing command, air density ratio, and rotor advance ratio.

In addition to one or more of the features described above, or as an alternative, further embodiments could include the processor configured to determine the corrective differential lateral cyclic command with a model which is a function of measured differential rolling moments and targeted differential rolling moments.

In addition to one or more of the features described above, or as an alternative, further embodiments could include the processor configured to vary the targeted differential rolling moment based upon aircraft flight condition, including at a minimum longitudinal velocity.

In addition to one or more of the features described above, or as an alternative, further embodiments could include the processor configured to determine an error value between the measured and targeted differential rolling moments.

In addition to one or more of the features described above, or as an alternative, further embodiments could include the processor configured to determine the corrective differential lateral cyclic command for rotor speeds above a predefined threshold value.

In addition to one or more of the features described above, or as an alternative, further embodiments could include the processor configured to determine the corrective differential lateral cyclic command as (i) a function of a gain of the rotor advance ratio and/or (ii) a function of upper and lower limits of differential lateral cyclic.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
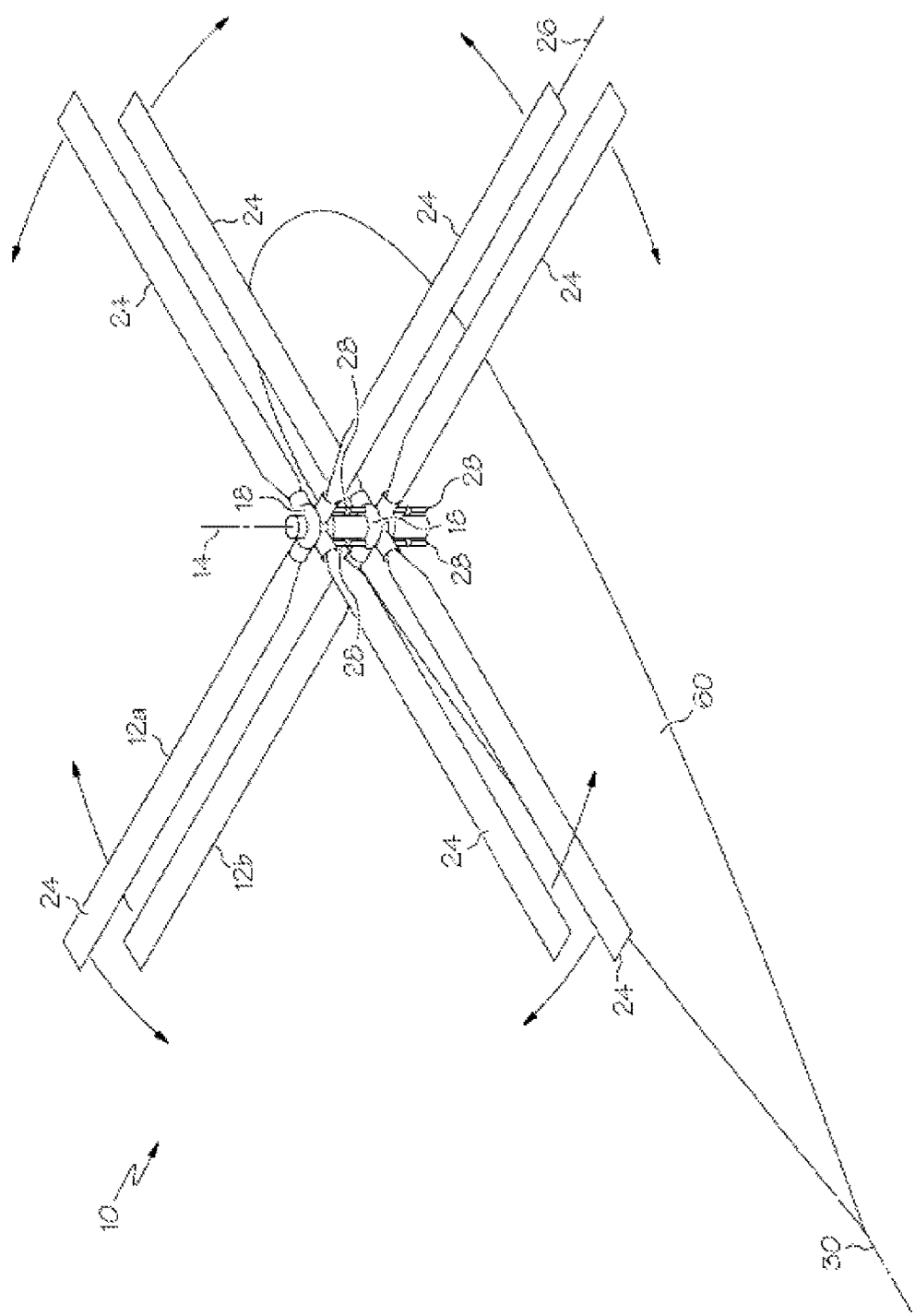
FIG. 1 is a schematic view of an exemplary helicopter according to an embodiment of the invention.

Shown in FIG. 1 is a schematic of an embodiment of rotary-wing aircraft such as, for example, a rigid dual-rotor helicopter 10. The helicopter 10 includes an airframe 60 and two rotors 12a and 12b arranged concentrically at the airframe 60 at a rotor axis 14. The rotors 12a and 12b counter-rotate such that, for example, when viewed from above, rotor 12a rotates in a counterclockwise direction and rotor 12b rotates in a clockwise direction. It is to be appreciated that, in other embodiments, the directions of rotation of the rotors 12a and 12b may be reversed. Each of the rotors 12a and 12b is connected to its respective conventional swashplate 18. Swashplate 18 is driven by one or more control servos 28 to move and/or tilt the swashplate 18 with respect to the rotor axis 14. Motion of the swashplate 18 along the rotor axis 14 will cause the blades 24 to vary pitch collectively relative to a blade axis 26, and tilting, either longitudinally or laterally, of the swashplate 18 relative to the axis 14 will cause the blades 24 to pitch cyclically in respective longitudinal or lateral directions relative to the blade axis 26. Further, the rotors 12a and 12b may be commanded to do the same thing either collectively or cyclically (referred to as ganged) or may be commanded to pitch or roll opposite to the other rotor (referred to as differential).

Figure 2:
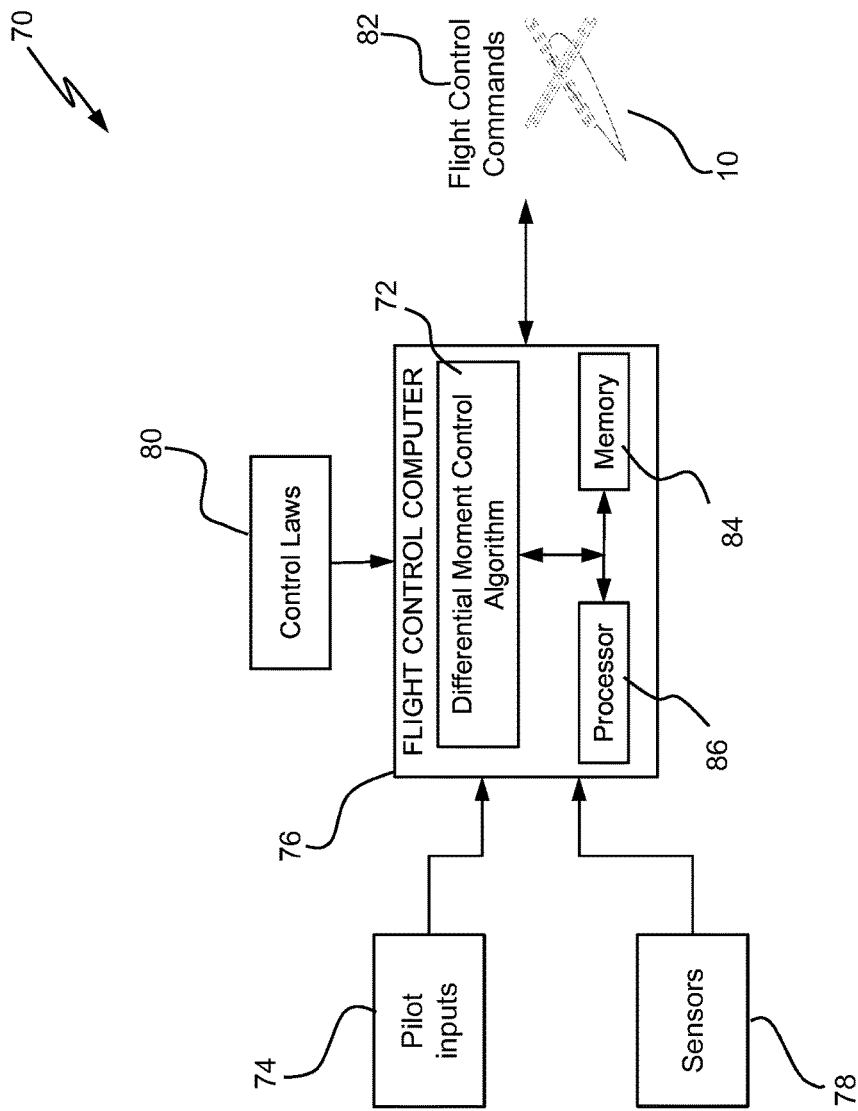
FIG. 2 is a schematic diagram of an embodiment of a control system for a helicopter.

Referring to FIG. 2, in order to manage the differential roll moments induced by lift offset, a model following control system 70 is implemented with a differential moment control algorithm 72 (also referred to as "control algorithm 72"). Control algorithm 72 determines a required amount of differential lateral control that is needed to maintain a desired amount of lift offset, thus keeping the differential roll moments that are induced by the lift offset within the design limits and improving tip clearance. Control algorithm 72 is at least based on collective commands to rotors 12a and 12b (FIG. 1) in order to counteract the large differential rotor moments that are induced in the helicopter 10. In an embodiment, control algorithm 72 utilizes scheduled gain and rotor advance ratio to determine a differential lateral cyclic command that achieves a targeted differential rolling moment for helicopter 10. In an embodiment, control algorithm 72 determines the required amount of differential lateral control needed to manage the differential rolling moment based on the rotor advance ratio, air density ratio and commanded collective position. If any of these inputs change, an updated differential lateral control will be determined and/or commanded from control algorithm 72 in order to keep the differential rolling moment at the desired magnitude.

A schematic of control system 70 to accomplish this is illustrated. Pilot inputs 74, for example, from a controller such as a pilot collective stick and/or a pilot cyclic stick are received by flight control computer 76 (FCC 76) as commanded collective pitch or roll rates. These may include differential or ganged collective and cyclic inputs. Pilot inputs 74 include commands to control a direction of flight, for example, roll, pitch or the like. A number of sensors 78 are located on helicopter 10 to sense parameters during flight such as pitch and/or roll angular velocities, pitch and/or roll angular accelerations, vertical acceleration, airspeed, air density, or the like. Data from sensors 78 is directed to FCC 76 operably connected to sensors 78 where it is compared to control laws 80. Control laws 80 define flight control commands 82 for helicopter 10 based on a scheduled gain as a function of a rotor advance ratio, which is described in detail below with reference to FIG. 6.

FCC 76 automatically determines estimated differential lateral cyclic commands as a function of the commanded collective position, rotor advance ratio, and air density ratio, in order to produce desired differential rolling moments on rotors 12a,12b (FIG. 1). In an embodiment, FCC 76 includes a memory 84. Memory 84 stores control algorithm 72 as executable instructions that are executed by processor 86. The instructions may be stored or organized in any manner and at any level of abstraction, such as in connection with the execution of control algorithm 72. Processor 86 may be any type of processor (CPU), including a general purpose processor, a digital signal processor, a microcontroller, an application specific integrated circuit, a field programmable gate array, or the like. Also, in embodiments, memory 84 may include random access memory (RAM), read only memory (ROM), or other electronic, optical, magnetic, or any other computer readable medium onto which is stored the mixing algorithm described below.

Figure 3:
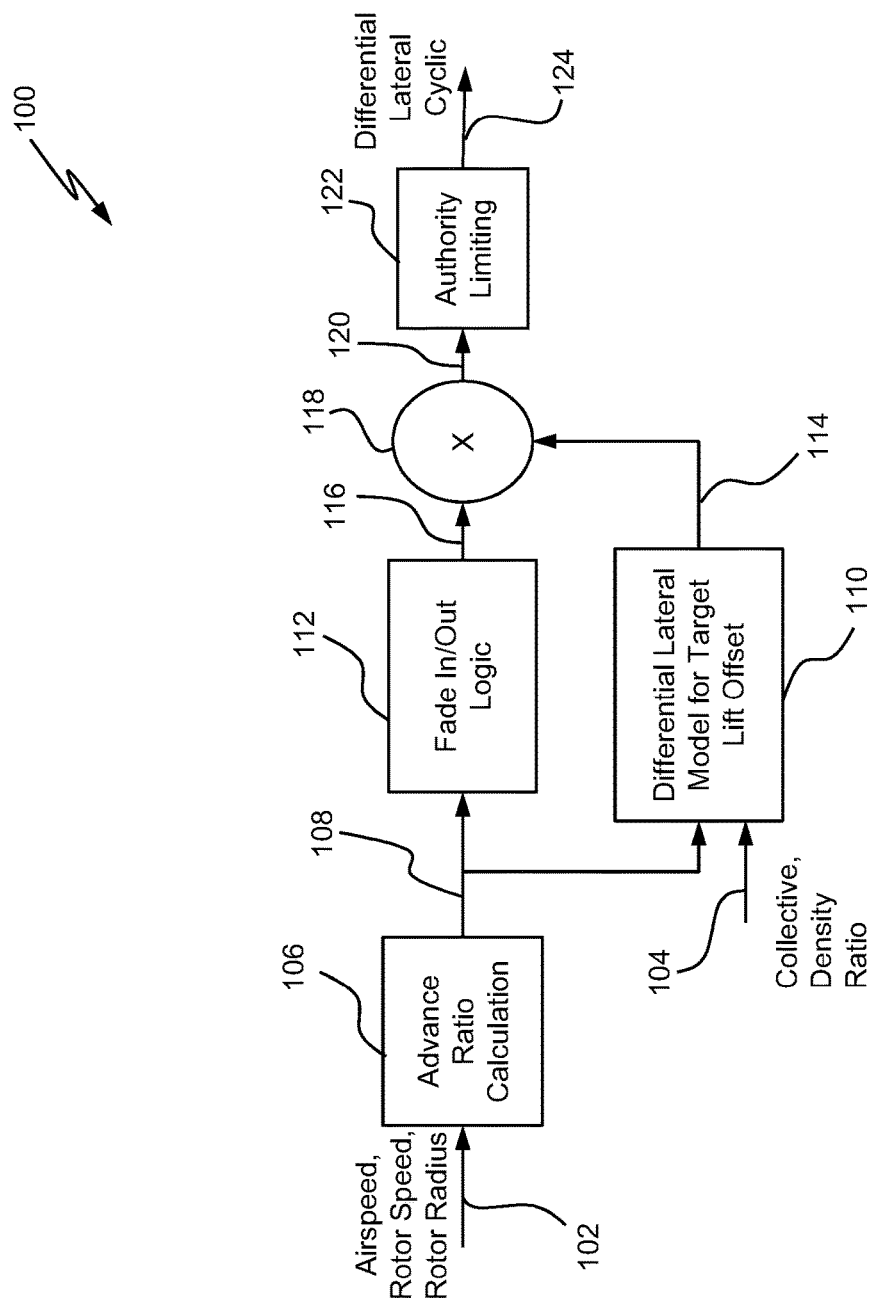
FIG. 3 is a schematic block diagram of an architecture for implementing automatic control of lift offset using a model-based approach to differential lateral determination.

FIG. 3 illustrates a schematic block diagram of a high level architecture 100 that is implemented by control algorithm 72 for determining differential lateral cyclic commands 124 for determining differential lateral cyclic commands via a model-based approach according to an embodiment. Initially, sensed parameters that are received from sensors 78 (FIG. 2) and/or calculated or estimated parameters are received as signals 102, 104 that are stored in FCC 76 (FIG. 2). For example, signals 102 represent an estimate of the magnitude of the helicopter's airspeed or longitudinal velocity, rotor speed, and rotor radius. In an embodiment, longitudinal velocity (or forward speed) in knots can be converted into feet per second (fps) where signal 102 represents foot longitudinal velocity in fps (or foot forward speed). Also, signals 104 represent ganged collective mixing command and air density ratio. Air density ratio is a ratio of a relative density of air in flight to the density of air at sea level. Signal 102 is inputted into advance ratio calculation block 106, which outputs signal 108 that represents a rotor advance ratio as a function of airspeed and rotor speed. Also, signals 104, 108 are inputted into differential lateral model 110. Output signal 114 represents degree or degrees of differential lateral cyclic command 124 as a function of ganged collective mixing command, air density ratio, and rotor advance ratio. A detailed description of differential lateral model 110 is provided below in reference to FIG. 5. Fade in/out logic block 112 receives signal 108 that represents rotor advance ratio and outputs signal 116 that represents a corrective differential lateral cyclic command. Signals 114, 116 are multiplied in multiplier block 118, which outputs a multiplied signal 120. Multiplied signal 120 is inputted into authority limiting block 122 and outputs a differential lateral cyclic command 124 as a function of upper and lower limits of differential roll moments. Architecture 100 determines the required amount of differential lateral cyclic command 124 needed to manage the differential rolling moment based on signals 104, 108 for air density ratio, ganged collective mixing command, and rotor advance ratio.

Figure 4:
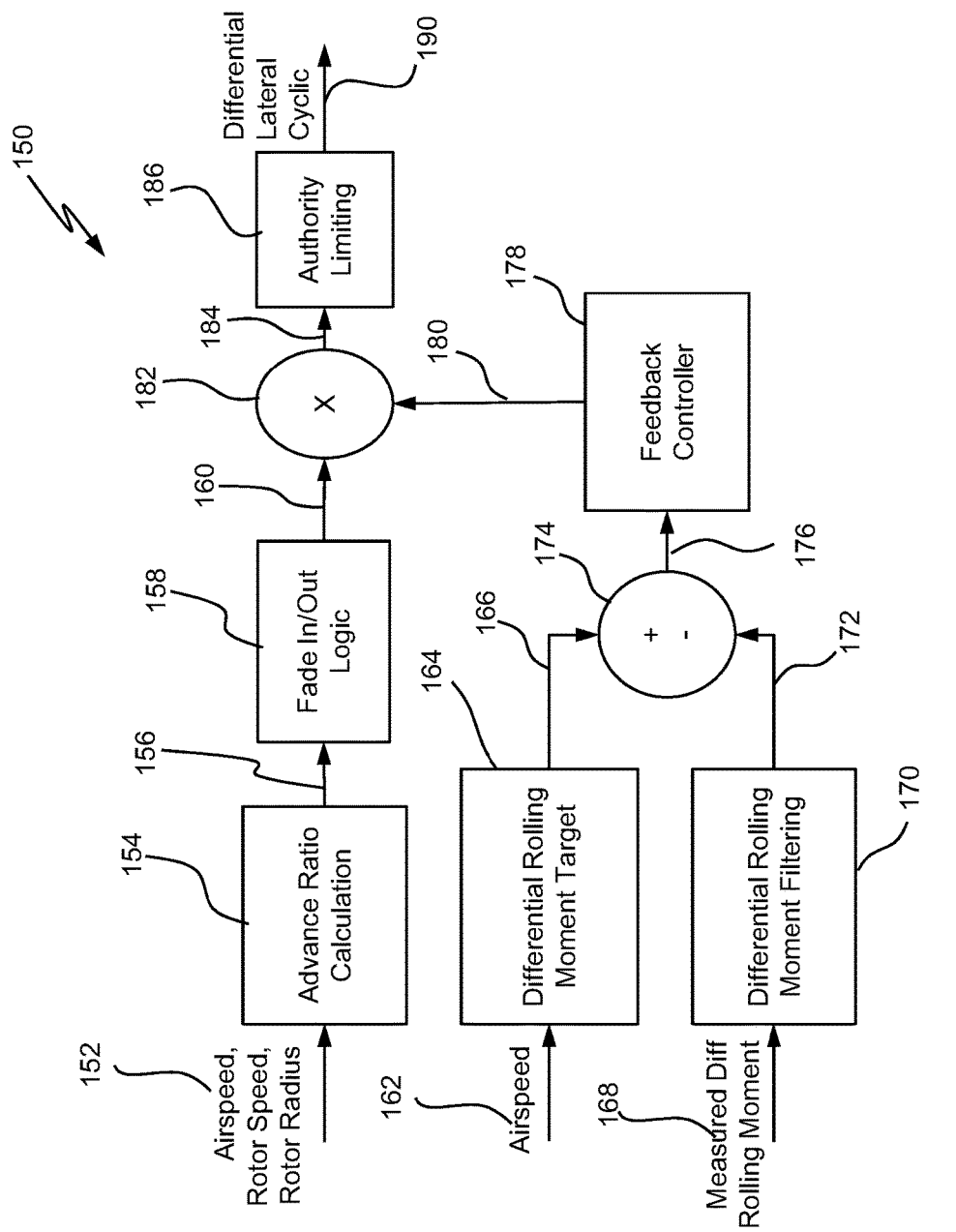
FIG. 4 is a schematic block diagram of an architecture for implementing automatic control of lift offset using a feedback-based approach to differential lateral determination.

FIG. 4 depicts a schematic block diagram of high-level architecture 150 that is implemented by control algorithm 72 for determining differential lateral cyclic commands 122 as a function of sensed differential rolling moments according to another embodiment of the invention. Architecture 150 is substantially similar to architecture 100 but uses measured hub rolling moments of rotors 12a, 12b including error values between a reference signal and a measured signal for differential rolling moment loads on the rotors. Initially, sensed parameters from sensors 78 (FIG. 2) and/or calculated or estimated parameters are received as signals 152, 162, and 168 that are stored in FCC 76 (FIG. 2). For example, signal 152 represents an estimate of the magnitude of helicopter 10 airspeed or longitudinal velocity, rotor speed, and rotor radius; signal 162 represents an estimate of the magnitude of helicopter 10 airspeed; and signal 168 represents measured differential hub rolling moments for rotors 12a, 12b (FIG. 1). In an embodiment, longitudinal velocity (or forward speed) in knots can be converted into feet per second (fps) where signal 152 represents foot longitudinal velocity in fps (or foot forward speed). Signal 152 is inputted into advance ratio calculation block 154, which outputs signal 156 that represents a rotor advance ratio. Fade in/out logic block 158 receives signal 156 and outputs a signal 160 that represents a corrective differential lateral cyclic command.

Also, differential rolling moment target block 164 receives signal 162 as input and outputs a signal 166 that represents a desired differential lateral rolling moment. Further, differential rolling moment filter block 170 receives signal 168 and outputs a signal 172 that represents a reference value of actual differential rolling moment. Summation block 174 receives signals 166, 172 and outputs a signal 176 that represents an error value between reference signal 172 and signal 166. Feedback controller block 178 receives the error value and outputs signal 180 that represents gain for determining a corrected differential rolling moment. Signals 160, 180 are multiplied in multiplier block 182 to output a multiplied signal 184. Multiplied signal 184 is inputted into authority limiting block 186 to outputs a differential lateral cyclic command 190 based on limits of differential lateral cyclic in order to produce a desired differential rolling moment on rotors 12a, 12b (FIG. 1).

Figure 5:
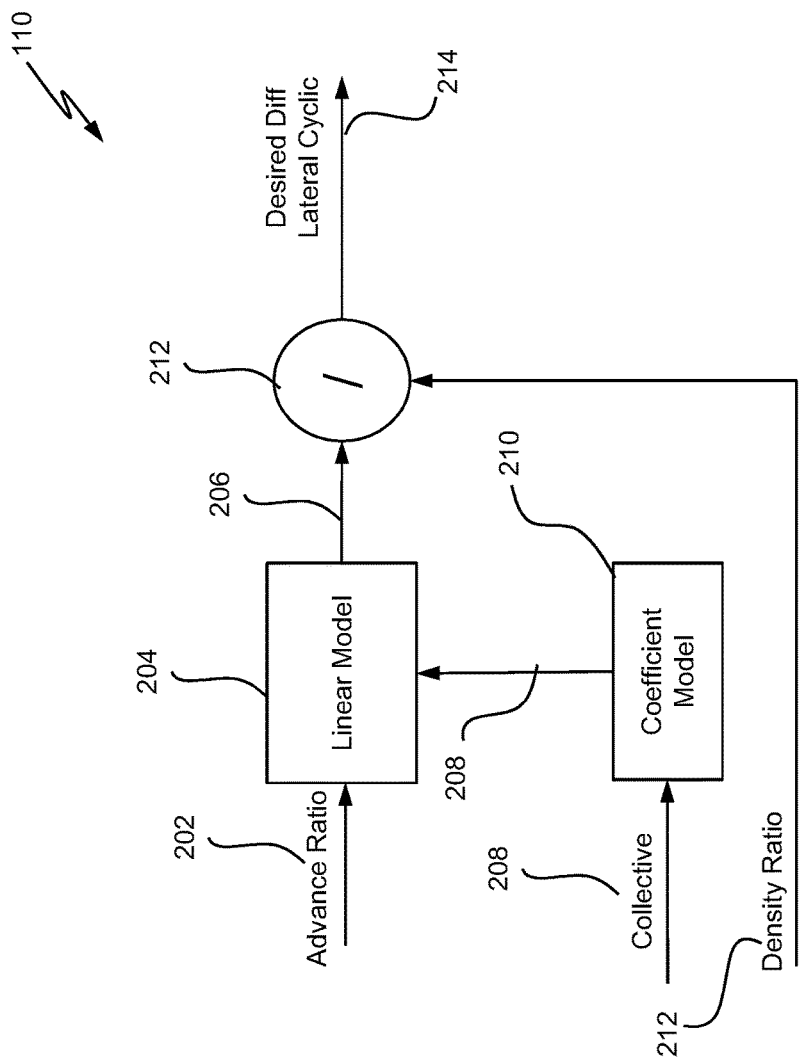
FIG. 5 is a bock diagram of a differential lateral model that is shown in FIG. 3 according to an embodiment of the invention.

FIG. 5 illustrates a schematic diagram of differential lateral model 110 for target lift offset as shown in FIG. 3. Signal 202 represents rotor advance ratio, signal 208 represents ganged collective mixing command, and signal 212 represents air density ratio. Signal 208 is applied to coefficient model 210 which is a linear model based on collective mixing command. Coefficient model 210 is a linear fit based on ganged collective mixing command and outputs signal 208 for coefficients that are linear with respect to ganged collective mixing command. In an example, output signal 208 comprises slope with advance ratio and bias. Linear model 204 receives signals 208 and 202 as inputs and outputs a signal 206 that is a quantity of corrective differential lateral cyclic command. Signal 206 is applied to divide block 212, which outputs a signal 214 that is a normalized signal of differential corrective lateral cyclic commands based on air density ratio.

Figure 6:
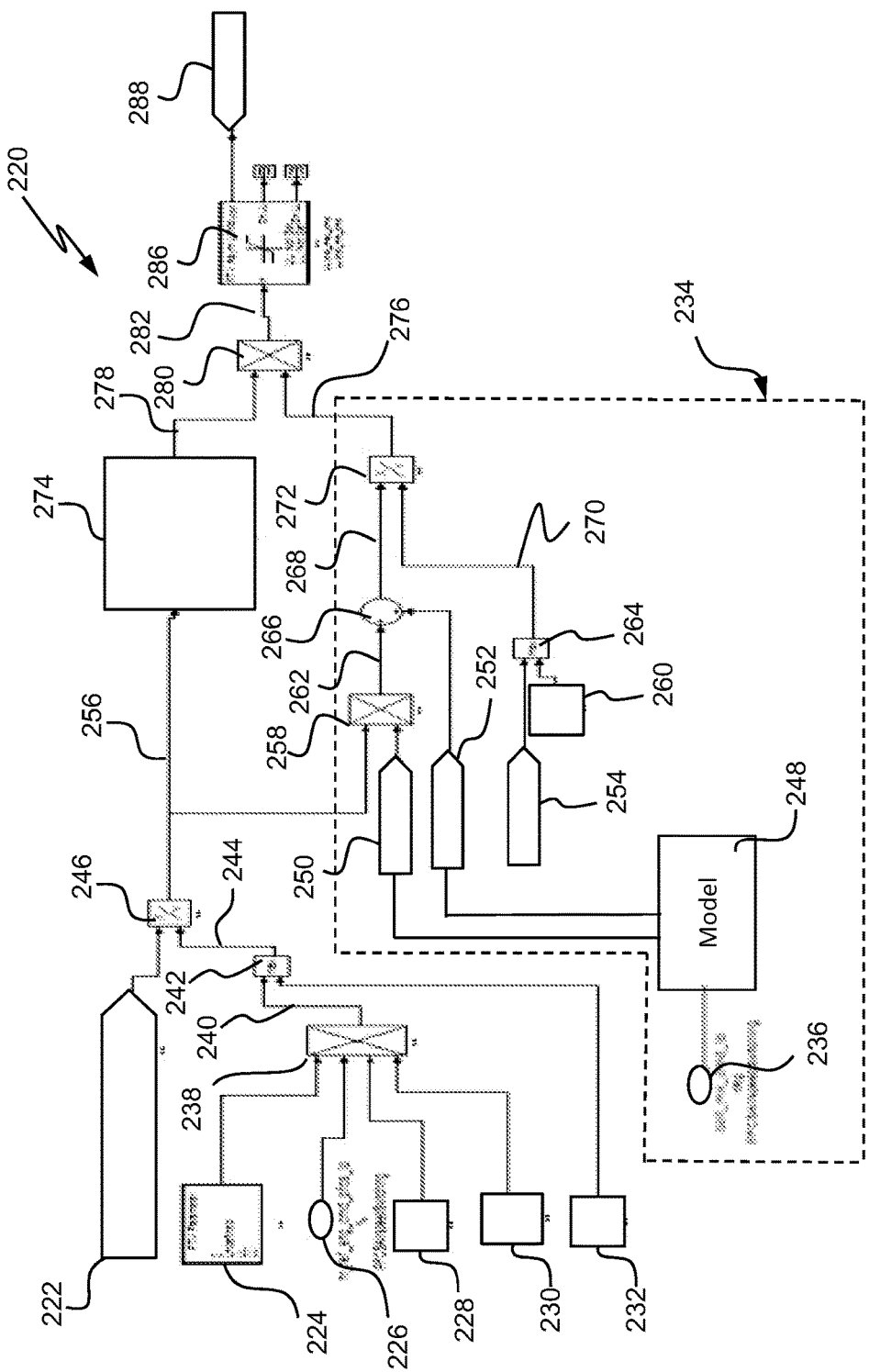
FIG. 6 is a schematic block diagram for implementing a control algorithm according to an embodiment of the invention as shown in FIG. 3.

FIG. 6 illustrates schematic detailed block diagram 220 for implementing control algorithm 72 by FCC 76 (FIG. 2) according to an embodiment of the invention. As such, FIG. 2 is also referenced in the schematic block diagram of FIG. 6. As shown, implementation of control algorithm 72, in an embodiment, begins when FCC 76 receives and stores the helicopter's sensed parameters from sensors 78 such as, for example, a signal that represents an estimate of the magnitude of the helicopter's longitudinal velocity 222 and a signal that represents a percentage of an estimate of angular velocity 226 of rotor 12a, 12b (FIG. 1). Additionally, flight control commands that are generated based on pilot manipulation of controllers are applied by control algorithm 72 as a ganged collective mixing command 236 to model block 248 in order to determine the degrees of differential lateral cyclic command to apply at predefined speeds of the rotor 12a, 12b.

Signal for angular velocity 226 (as a percentage) of rotors is inputted into a multiplier block 238 which outputs a signal that represents a linear velocity 240 of rotor (or rotor linear speed 240). The multiplier block 238 determines linear velocity of rotor 240 by multiplying a signal for angular velocity 226 according to the following: multiplied by a signal from limit block 224 in order to convert rotor angular velocity 226 to a value in the range of 0 to 1.15. In an embodiment, angular velocity 226 is converted to a value in the range of about 0.8 to about 1.15, multiplied by signal for a constant 228, and multiplied by a signal that represents a rotor radius 230 of rotor 12a, 12b in order to convert signal of angular velocity 226 to linear velocity 240 of rotor. In an embodiment, constant 228 has a value of about 0.010. Constant 232 represents divide by zero protection for rotor advance ratio block 246 and, in an embodiment, has a value of 0.010. Constant 232 and linear velocity 240 of rotor are inputted into maximum block 242. Maximum block 242 determines a maximum value from constant 232 and linear velocity 240 to produce a signal that represents rotor linear velocity 244 for values greater than zero. Foot longitudinal velocity 222 (as an 'X' input) and rotor linear velocity 244 (as a 'Y' input) are inputted into rotor advance ratio block 246. Advance ratio block 246 divides longitudinal velocity 222 by rotor linear velocity 244 and outputs a signal that represents a rotor advance ratio 256.

Block 234 represents an empirical model of how much corrective differential lateral cyclic command is required and includes a linear fit as a function of ganged collective mixing command 236, slope 250 and bias 252. Block 234 includes a model 248 having fixed gain blocks and parameter limits that receives a ganged collective mixing command 236 and outputs a signal representing slope 250 and bias 252. Slope 250 represents a slope of the dependence on rotor advance ratio 256. It is to be appreciated that at higher speeds of rotor, for example, above a predefined threshold value, control algorithm 72 implements a ganged collective mixing command 236 and does not utilize differential collective for determining corrective differential lateral cyclic command 288. Further, multiplier block 258 receives rotor advance ratio 256 and slope 250 and outputs a signal 262 as a product of advance ratio 256 and slope 250. Signal 262 and bias 252 are added together in summation block 266, which outputs a summation signal 268. Air density ratio 254 and constant 260 are inputted into a maximum block 264 to produce a signal 270 that represents a maximum value of air density ratio 254 and constant 260. Air density ratio 254 is a ratio of the relative density of air in flight to the density of air at sea level. Constant 260 represents divide by zero protection for divide block 272 and, in an embodiment, has a value of 0.010. Divide block 272 divides summation signal 268 (as a 'X' input) by signal 270 (as a 'Y' input) and outputs a signal 276 that represents an empirical model of a quantity of corrective differential lateral cyclic command that is applied at predefined rotor speeds in order to control differential roll moments of the rotors 12a, 12b.

Fade in/out logic block 274 includes a look-up table as a function of rotor advance ratio 256 and outputs a signal 278 to multiplier block 280. Fade in/out logic block 274 utilizes a schedule of gain for rotor advance ratio 256 that is defined by a longitudinal velocity 222 of aircraft 10 and linear velocity 244 of rotor in order to determine whether to output a corrective differential lateral cyclic command to implement on rotors 12a, 12b. The fade in/out logic block 274 determines whether to output a corrective differential lateral cyclic command based on a function of the rotor advance ratio 256 (which is a function of the rotor speed and forward speed). Multiplier block 280 receives signals 276, 278 and multiplies the respective signals 276, 278 in order to output a multiplied signal 282 to asymmetric limiter block 286. Asymmetric limiter block 286 determines the amount of corrective differential lateral cyclic command that is applied based on its upper and lower limits (of differential lateral cyclic) as well as to preserve lateral cyclic for roll maneuvering. Asymmetric limiter block 286 provides a corrective differential lateral cyclic command 288 to rotors 12a, 12b (See FIG. 1) based on upper and lower limits in order to maintain a specified or targeted differential rolling moment for the rotors 12a, 12b.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for controlling a differential rotor roll moment for a coaxial helicopter with rigid rotors, comprising:
   receiving, with a processor, a signal indicative of a displacement command from a controller;
   receiving, with the processor via a sensor, one or more signals indicative of a longitudinal velocity, an angular velocity of one or more rotors and an air density ratio for the helicopter;
   determining, with the processor, a ganged collective mixing command in response to the receiving of the displacement command;
   determining, with the processor, a rotor advance ratio as a function of the longitudinal velocity and the angular velocity;
   determining, with the processor, a corrective differential lateral cyclic command by determining coefficients from the ganged collective mixing command, applying the coefficients to the rotor advance ratio to obtain a value and normalizing the value by the air density ratio; and
   applying, with the processor, the corrective differential lateral cyclic command to the rigid rotors to control the differential rotor roll moment to a desired value.

2. The method of claim 1, further comprising determining the corrective differential lateral cyclic command as a function of measured differential rolling moments and targeted differential rolling moments.

3. The method of claim 2, further comprising varying the targeted differential rolling moment based upon aircraft flight condition, including at a minimum longitudinal velocity.

4. The method of claim 2, further comprising determining an error value between the measured and targeted differential rolling moments.

5. The method of claim 1, further comprising determining the corrective differential lateral cyclic command for rotor speeds above a predefined threshold value.

6. The method of claim 1, further comprising determining the corrective differential lateral cyclic command as (i) a function of a gain of the rotor advance ratio and/or (ii) a function of upper and lower limits of differential lateral cyclic.

7. The method of claim 1, further comprising determining a quantity of corrective differential lateral cyclic commands at different rotor speeds.

8. A control system for controlling a differential rotor roll moment for a coaxial helicopter with rigid rotors, comprising:
   one or more sensors configured to determine a longitudinal velocity of the helicopter, an angular velocity of one or more rotors and an air density ratio for the helicopter;
   one or more controllers configured to issue a displacement command during a flight maneuver; and
   a computer operably connected to the one or more controllers and configured to:
   determine a ganged collective mixing command in response to the displacement command;

determine a rotor advance ratio as a function of the longitudinal velocity and the angular velocity;

determine a corrective differential lateral cyclic command by determining coefficients from the ganged collective mixing command, applying the coefficients to the rotor advance ratio to obtain a value and normalizing the value by the air density ratio; and apply the corrective differential lateral cyclic command for the rigid rotors to control the differential rotor roll moment to a desired value.

9. The control system of claim 8, wherein the processor is configured to determine the corrective differential lateral cyclic command with a model which is a function of measured differential rolling moments and targeted differential rolling moments.

10. The control system of claim 9, wherein the processor is configured to vary the targeted differential rolling moment based upon aircraft flight condition, including at a minimum longitudinal velocity.

11. The control system of claim 8, wherein the processor is configured to determine an error value between the measured and targeted differential rolling moments.

12. The control system of claim 8, wherein the processor is configured to determine the corrective differential lateral cyclic command for rotor speeds above a predefined threshold value.

13. The control system of claim 8, wherein the processor is configured to determine the corrective differential lateral cyclic command as (i) a function of a gain of the rotor advance ratio and/or (ii) a function of upper and lower limits of differential lateral cyclic.

* * * * *